(12) United States Patent
Kim

(10) Patent No.: US 6,400,085 B1
(45) Date of Patent: Jun. 4, 2002

(54) BEAM INDEX TYPE CATHODE RAY TUBE

(75) Inventor: Tae-Sung Kim, Incheon (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 09/770,606

(22) Filed: Jan. 29, 2001

(30) Foreign Application Priority Data

Jan. 28, 2000 (KR) .......................................... 2000-4373

(51) Int. Cl.[7] .............................................. H01J 31/00
(52) U.S. Cl. ......................................... 315/10; 365/118
(58) Field of Search ........................... 315/10, 11, 11.5; 365/118, 128

(56) References Cited

U.S. PATENT DOCUMENTS 3,786,438 A * 1/1974 Packard ...................... 365/118

* cited by examiner

*Primary Examiner*—David Vu
(74) *Attorney, Agent, or Firm*—Staas & Halsey LLP

(57) ABSTRACT

A beam index type cathode ray tube for preventing distortion of index signals due to high frequency noises by protecting an optical detector and an index circuit part from the influence of high frequencies which are generated during the operation of the cathode ray tube, which includes a phosphor screen formed on an inner surface of a panel and having index stripes, an electron gun for emitting electron beams toward the phosphor screen, index light incident part formed on outer peripheral surfaces of respective light receiving windows of a funnel to be provided with the index light signals emitted from the index stripes via the respective light receiving window, optical cables respectively connected to the index optical incident parts for transmitting optical signals, an optical detector converting the optical signals provided from the optical cables to index current signals, an index circuit part synchronizing the index current signals with a color switching signal so as to transmit a precise color switching signal to the electron gun, and a high frequency shut-off part shutting off the optical detector and the index circuit part to block influence of high frequency noises.

32 Claims, 6 Drawing Sheets

Index light

Index light

BEAM INDEX TYPE CATHODE RAY TUBE

CROSS-REFERENCE TO RELATED APPLICATIONS

This application claims the benefit of Korean Application No. 2000-4373, filed Jan. 28, 2000, in the Korean Patent Office, the disclosure of which is incorporated herein by reference.

BACKGROUND OF THE INVENTION

1. Field of the Invention

The present invention relates to a cathode ray tube, and more particularly, to a beam index type cathode ray tube in which an optical detector and an index circuit part are protected from the influence of high frequency noises which are generated during the operation of the cathode ray tube, such that the distortion of index signals due to the high frequency noises may be prevented.

2. Description of the Related Art

In general, a beam index type cathode ray tube operates under a common principle that electron beams are generated, focused and accelerated in an electron gun and the beams are radiated on a phosphor screen to form images, except that functions per color section are performed through index stripes instead of a shadow mask.

FIG. 1 is a cross-sectional view of a related art beam index type cathode ray tube. The beam index type cathode ray tube includes a phosphor screen 3, and a pair of optical detectors 11 receiving index light signals through respective transparent light receiving windows 25 connected to a funnel 30. The phosphor screen 3 is formed with index stripes 7 having a predetermined interval therebetween. In FIG. 1, if an electron gun 1 emits an electron beam 5 toward the phosphor screen 3, the electron beam 5 excites one of the index stripes 7 so as to generate an optical pulse (an index light signal) 9 of an ultraviolet ray range, and the index light signal is detected by one of the optical detectors 11 to be converted to an index current signal. An index circuit part 13 controls deflection degrees and a current value of the electron beam by synchronizing the index current signal with a color signal, so that it realizes a desired color.

The index circuit part 13 comprises an index signal processing part 131 which processes the index current signal received from the optical detector 11, a deflection control circuit 133 which performs deflection control on the processed index current signal and provides the output to the deflection yoke 15, and a current density control circuit 135 which performs current density control on the processed index current signal and provides the output to the electron gun 1.

In the beam index type cathode ray tube as described above, the optical detectors 11, which are formed of general photo diodes, positioned in the vicinity of a deflection yoke 15 for effectively focusing the index light signals emitted from the index stripes 7, and the index circuit part 13 are connected to each other via either a wire having no ability to accomplish high frequency shut-off or a high frequency cable to transmit electrical signals.

Accordingly, the optical detector 11 for converting the index light signal 9 into an electrical signal and the wire or the high frequency cable for transmitting the electrical signal to the index circuit part 13 are subject to the influence of various high frequency noises including deflection signals of about 15.75 kHz, which are applied to the deflection yoke 15. Generally, these high frequency noises are above 10 kHz.

Therefore, when the cathode ray tube is operating, the index current signal is apt to be distorted due to the high frequency noises, disturbing precise output of a color switching signal, thereby resulting in the degradation of the quality of an image displayed on the beam index type cathode ray tube.

Further, the related art has a disadvantage in that the beam index type cathode ray tube includes one or two pairs of the optical detectors 11 for a large size cathode ray tube such that the index circuit part 13 should carry out another process for summing the index current signals provided from the respective optical detectors 11.

Also, there are further disadvantages in that the manufacturing cost is increased due to the use of expensive photo diodes and the outer structure of the cathode ray tube set is limited due to the problems relating to the size of the optical detector 11, attachment position thereof, and connection with the index circuit part 13.

SUMMARY OF THE INVENTION

It is an object of the present invention to provide a beam index type cathode ray tube in which an optical index circuit part may be protected from the influence of high frequency noises such that an index current signal is prevented from being distorted by high frequency noises.

It is another object to provide a beam index type cathode ray tube in which a single optical detector is employed such that a process for summing two or four index signals in an index circuit part may be omitted, thereby simplifying the arrangement of the index circuit part and reducing the manufacturing cost thereof.

It is a further object to provide a beam index type cathode ray tube in which positions of an optical detector and an index circuit part may be freely set, thereby simplifying and optimizing the design of the structure of the cathode ray tube.

Additional objects and advantages of the invention will be set forth in part in the description which follows and, in part, will be obvious from the description, or may be learned by practice of the invention.

In order to achieve the above and further objects of the present invention, a beam index type cathode ray tube includes a phosphor screen formed on an inner surface of a panel and having index stripes, an electron gun emitting electron beams toward the phosphor screen, an index light incident part formed on an outer peripheral surface of a light receiving window of a funnel to be provided with index light signals emitted from the index stripes via the light receiving window, an optical cable, connected to the index light incident part, transmitting an optical signal, an optical detector converting the light signal provided from the optical cable to an index current signal, and an index circuit part, synchronizing the index current signal with a color switching signal, transmitting a precise color switching signal to the electron gun, wherein a high frequency shut-off part is further included which shuts off the optical detector and the index circuit part to block influence of high frequency noises.

In the present invention described above, index light signals are provided via the index light incident part formed on the outer surface of the light receiving window, and transmitted to the optical detector via an optical cable without loss of light signals, and the optical detector is mounted in the high frequency shut-off part with the index circuit part.

Therefore, the optical detector and the index circuit part are shielding from the influence of the high frequency noises including the deflection signals, the arrangement of the index circuit part is simplified by using the single optical detector, and the construction of the cathode ray tube and TV set is optimized without any limitation in the attachment position of the high frequency shut-off part.

DETAILED DESCRIPTION OF THE PREFERRED EMBODIMENTS

Figure 1:
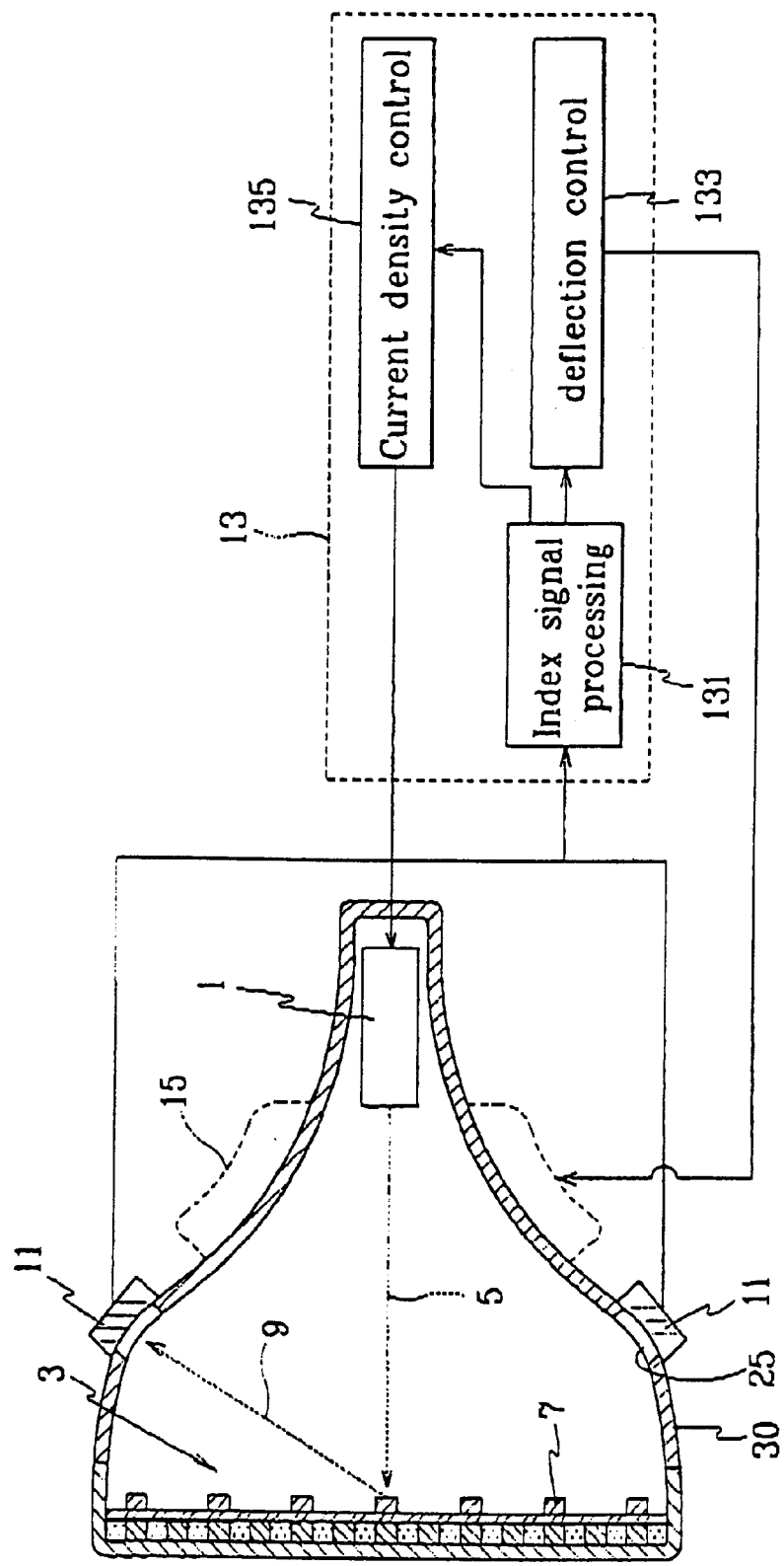
FIG. 1 is a cross-sectional view of a related art beam index type cathode ray tube.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
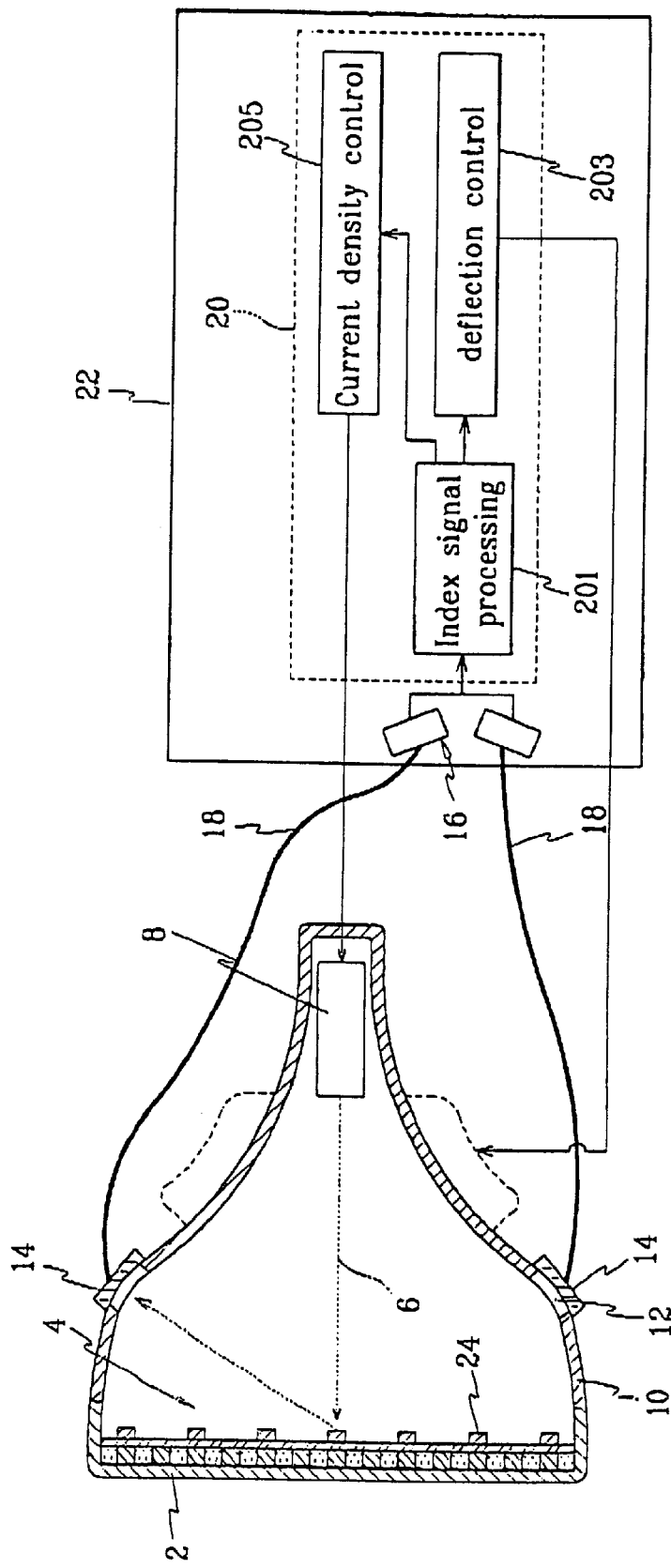
FIG. 2 is a schematic view of a beam index type cathode ray tube according to a first embodiment of the present invention.

FIG. 2 is a schematic view of a beam index type cathode ray tube according to a first embodiment of the present invention, which includes a phosphor screen 4 formed in a panel 2, an electron gun 8 emitting an electron beam 6 toward the phosphor screen 4, a pair of index light incident part 14 respectively positioned at outer surfaces of transparent light receiving windows 12 of a funnel 10, a pair of optical cables 18 respectively connected to the index light incident parts 14 and a pair of optical detectors 16 transmitting index light signals, and a high frequency shut-off part 22 shutting off the optical detectors 16 and an index circuit part 20.

The phosphor screen 4 is formed with index stripes 24 having a predetermined interval therebetween, such that the index stripes 24 are excited so as to generate index light signals of an ultraviolet ray range as the electron beam 6 is radiated from the electron gun 8, wherein the index light signal is provided to one of the index light incident parts 14 via the respective light receiving window 12.

Figure 3:
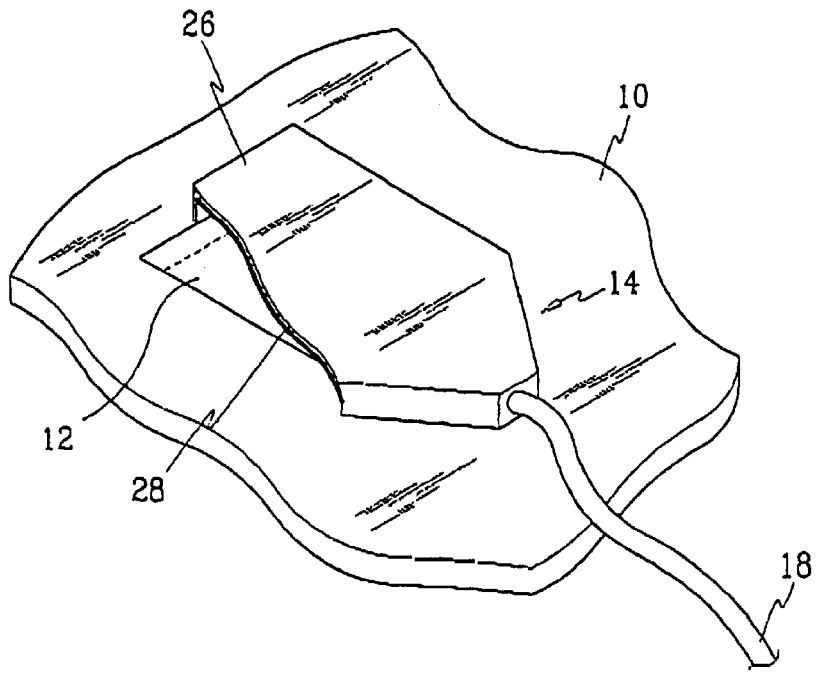
FIG. 3 is a partial perspective view of a index light incident part of the beam index type cathode ray tube shown in FIG. 1.

As shown in FIG. 3, each index light incident part 14 transmits the provided index light signal to the respective optical cable 18, which includes a covering element 26 attached to an outer surface of the light receiving window 12 and connected to a side of the optical cable 18 and a high reflection film 28. The high reflection film 28 is formed on an inner wall of the covering element 26 and made of a film acting as a mirror surface which is reflection-processed with aluminium or magnesium oxide.

Figure 4:
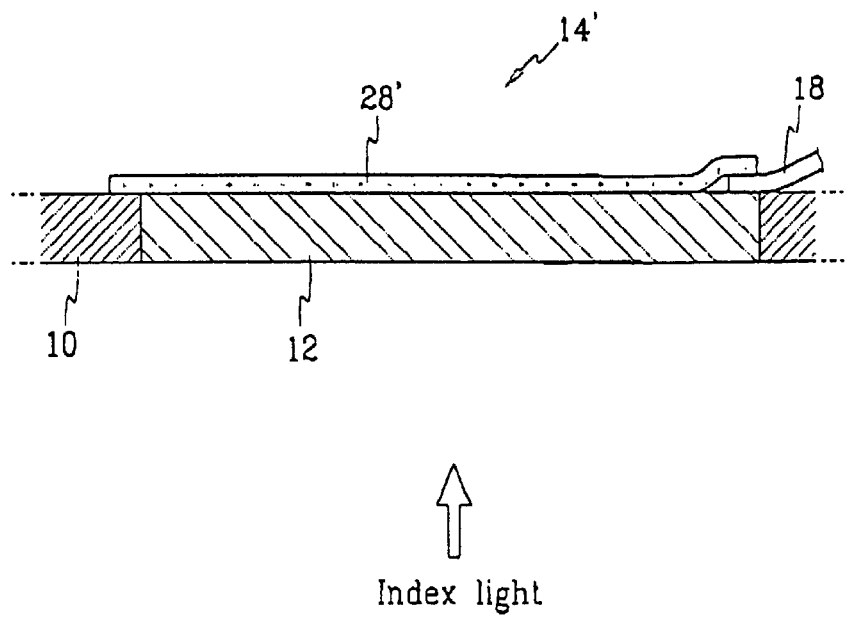
FIG. 4 is a cross-sectional view of an optical cable surrounded by a high reflection film which is attached on an outer surface of a light receiving window 12 of the beam index type cathode ray tube shown in FIG. 1 according to other embodiments of the present invention.

In another embodiment, as shown in FIG. 4, each index light incident part 14' may comprise a high reflection film 28' which is attached on the outer surface of the light receiving window 12 and surrounds an end of the respective optical cable 18. The high reflection film 28' reflects the index light which is transmitted through the light receiving window 12 so as to provide the index light into the optical cable 18.

In this structure, a dichroic mirror (not shown), selectively transmitting the light of an ultraviolet ray range, can be positioned between the outer surface of the light receiving window 12 and an inner surface of the high reflection film 28'. Thus, the dichroic mirror increases the index light receiving efficiency of the index incident part 14', and decreases the index light which is reflected from the high reflection film 28' into the funnel 10.

In the above described structure, as the index light signal is incident via the light receiving window 12, the index light signal is reflected against the high reflection film 28 formed on the inner wall of the covering element 26, and the optical cable 18 transmits the index light signal to the optical detector 16 incorporated in the high frequency shut-off part 22.

The optical cable 18 is a typical light transmitting medium that transmits a light signal effectively by using total reflection of optical fibers. In the present embodiment, the optical cable 18 may employ a single optical cable or a plurality of bundles of optical cables for increasing a light receiving area.

Figure 5:
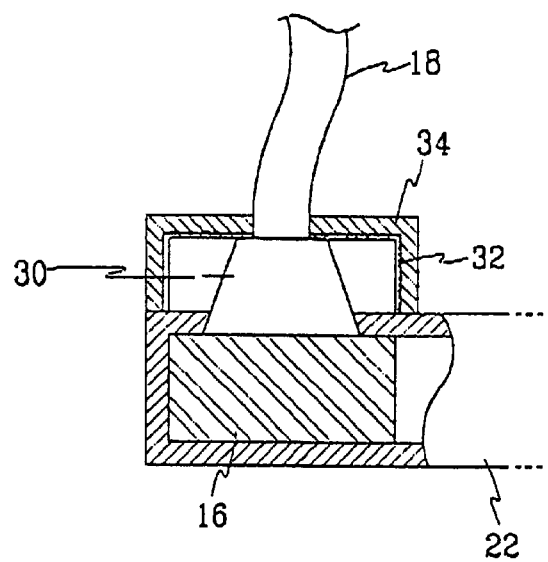
FIG. 5 is a schematic view of a connection part between an optical cable and an optical detector of the beam index type cathode ray tube shown in FIG. 1.

In order to minimize the decrease of the index light signal between the optical cable 18 and the optical detector 16, as shown in FIG. 5, a prism 30 connects the optical cable 18 and the optical detector 16 and a shut-off element 34 is provided to shielding the prism 30 from the outside and formed with a high reflection film 32 on an inner wall thereof. Therefore, even though the optical light signal transmitted from the optical cable 18 is partially leaked, the leaked optical signal is reflected against the high reflection film 32 and transmitted to the optical detector 16 again.

The optical detector 16, which receives the index light signal transmitted via the optical cable 18, converts the provided index light signal to an index current signal. The optical detector 16 is directly provided with the index light signal of an ultraviolet ray range via the optical cable 18, for example, a photo multiplier tube PMT or a photodiode which has a high sensitivity with relation to a light pulse of the ultraviolet ray range may be employed as the optical detector 16.

The index circuit part 20 processes the electrical signal output from the optical detectors 16 using an index signal processing circuit 201 and produces a precise color signal by synchronizing with a color switching signal. Thus, the index circuit part 20 transmits a deflection signal to the deflection yoke 15 by controlling a deflection degree, using a deflection control circuit 203, and a current density signal to the electron gun 8 by controlling current density, using a current density control current 205.

Figure 6:
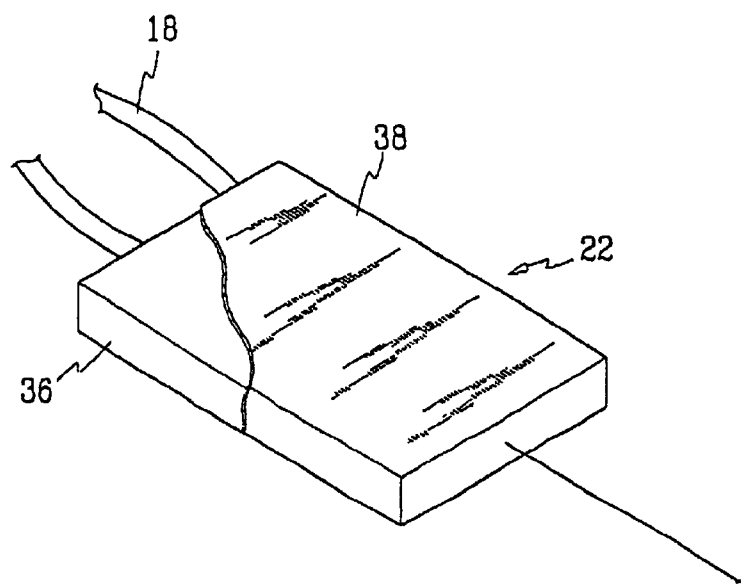
FIG. 6 is a schematic view of a high frequency shut-off part of the beam index type cathode ray tube shown in FIG. 1.

The optical detectors 16 and the index circuit part 20 are mounted in the high frequency shut-off part 22, and accordingly protected from influence of high frequency noises including a deflection signal. In more detail, the high frequency shut-off part 22, as shown in FIG. 6, includes a receiving part 36 formed of plastic materials for incorporating the optical detectors 16 and the index circuit part 20, and a high frequency shut-off film 38 to be attached on an outer wall of the receiving part 36, wherein the high frequency shut-off film 38 is to be a metal film having a good effect of shutting off a high frequency, such as a thin plate of stainless steel. The high frequency shut-off part 22 may be attached at a position similar to that of a signal processing board.

As described above, in the present embodiment, the optical detectors 16 are mounted in the high frequency shut-off part 22 together with the index circuit part 20, instead of being attached to the outer wall of the light receiving window 12, and receive the index light signals provided to the index light incident parts 14 via the optical cables 18 which are not under the influence of the high frequency noises.

Therefore, the optical detectors 16, the index circuit part 20 and the optical cables 18 are free from the influence of the high frequency noises including the deflection signal, and accordingly, prevent the distortion of the index light signal. Further, the position of the high frequency shut-off part 22 may be randomly changed. As a result, the structure of the TV set may be optimized.

Figure 7:
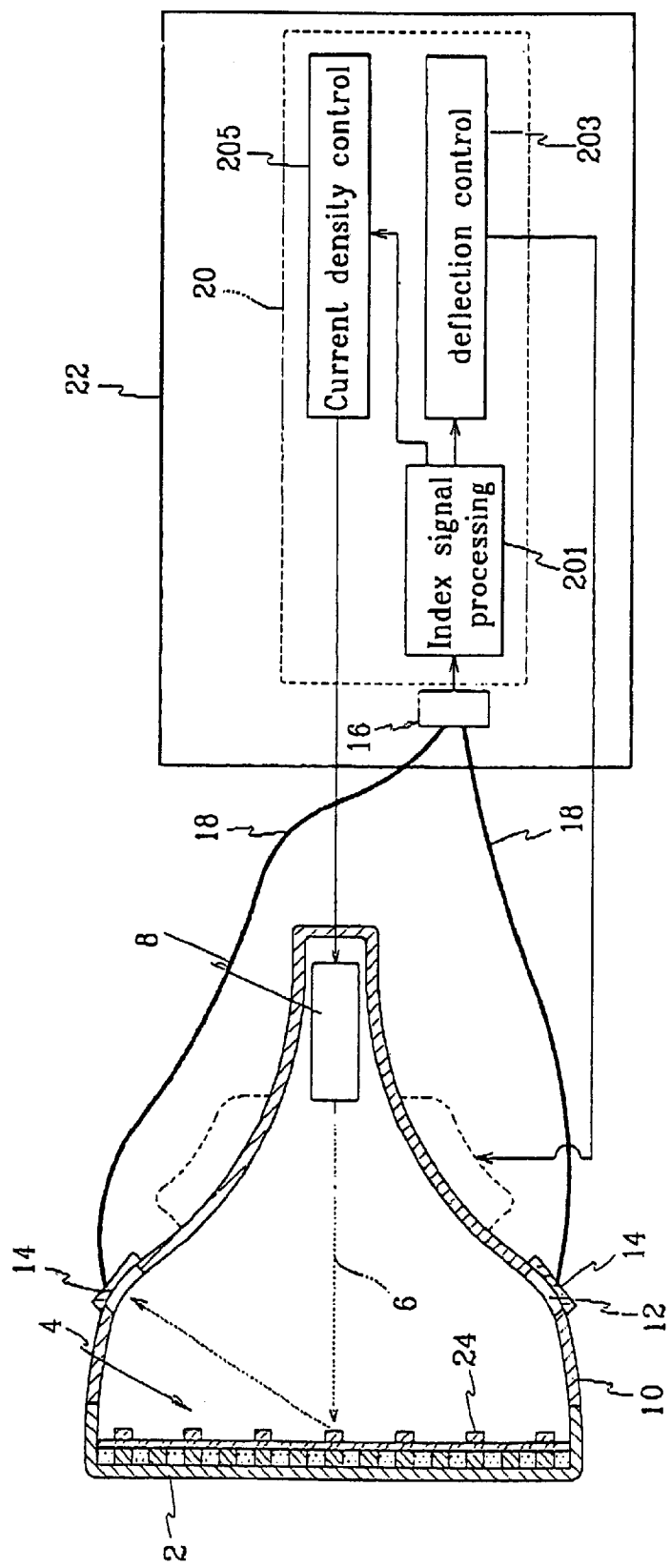
FIG. 7 is a schematic view of a beam index type cathode ray tube according to a preferred embodiment of the present invention.

FIG. 7 is a schematic view of a beam index type cathode ray tube according to a second embodiment of the present invention.

In the second embodiment, a single optical detector 16 is provided and connected to one or two pairs of the optical cables 18, for example a pair of optical cables 18 are shown. Thus, the optical detector 16 simultaneously receives index light signals provided from index light incident parts 14 provided at two or four places simultaneously, for example the index light incident parts 14 may provided at two places as shown.

In general, two or four optical detectors are utilized for minimizing portions in which index light signals generated in the cathode ray tube are difficult to detect. In the present invention, the single optical detector 16 also performs the same functions as the previous two optical detectors 16 in the first embodiment since one or two pairs of the index light incident parts 14 and the optical cables 18 are provided with the index light signals at the same positions as the same elements in the first embodiment shown in FIG. 2.

If the single optical detector 16 converts index light signals provided from the pair of optical cable 18 into electrical signals, the index circuit part 20 may omit the process for adding the electrical signal outputs from the pair of optical detectors 16, simplifying the circuit arrangement thereof and the use of the optical detector 16 may be reduced when mass-producing the cathode ray tubes, thereby reducing the manufacturing cost.

Figure 8:
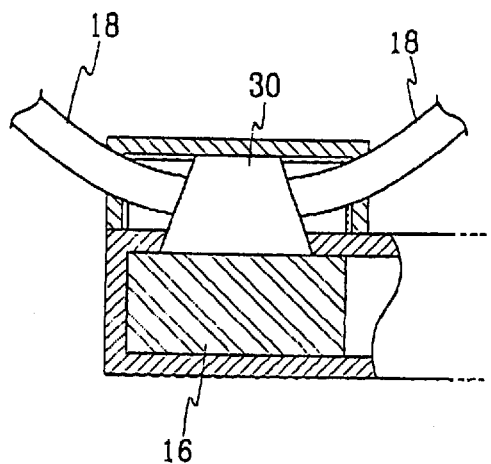
FIG. 8 is a schematic view of a connection part between an optical cable and an optical detector of the beam index type cathode ray tube shown in FIG. 7.

If the pair of optical cables 18 and the single optical detector 16 are, as shown in FIG. 8, respectively positioned at opposite sides of a prism 30, the optical detector 16 may receive optical signals transmitted via the pair of optical cables 18 simultaneously via the prism 30.

Figure 9:
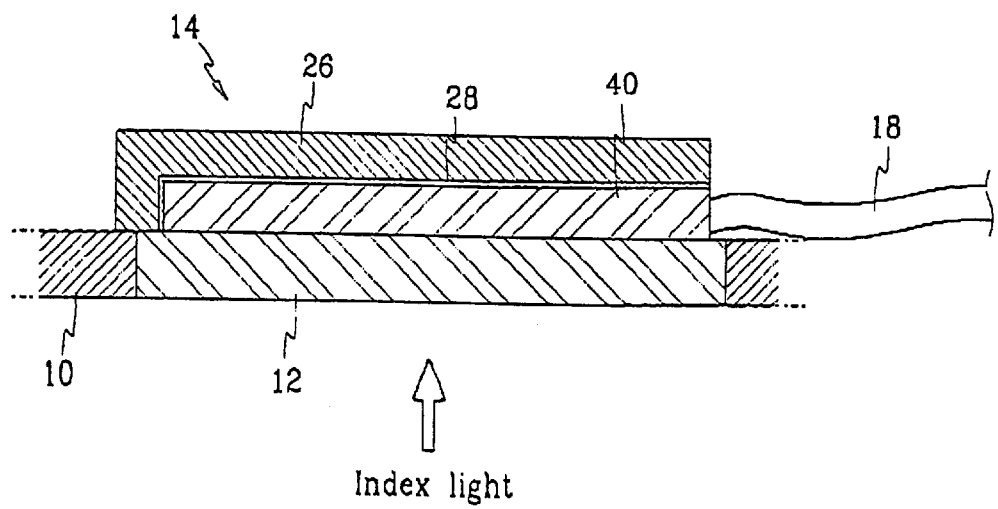
FIG. 9 is a cross-sectional view of an index light incident part of the beam index type cathode ray tube shown in FIG. 7.

The optical detector 16 employed in the present embodiment, may be a photodiode using silicon elements, and the photodiode usually has a high sensitivity with relation to light beams of a long wavelength. Therefore, as shown in FIG. 9, a light focusing plate 40 is further provided to the index light incident part 14 for converting light pulses of the ultraviolet ray range of 300–400nm to a light pulse of a long wavelength of 600–900nm. Such a light focusing plate 40 is positioned in the covering element 26, which is facing the light receiving window 12 and attached to an end of the optical cable 18.

In more detail, the light focusing plate 40 is produced by an injection molding by mixing a fluorescent dye such as Hostasol Yellow8G and Hostasol Yellow3G with a medium of Poly Methyl MethAcrylate PMMA, a kind of plastic having a high thermoplasticity.

In order to radiate the incident light signals passed through the light receiving window 12 to a surface attached with the optical cable 18, the light focusing plate 40 is produced with a medium having a high index of refraction and low permeability. The light pulses of the ultraviolet ray range are converted to the optical signals having the long wavelengths by the fluorescent dyes which are uniformly dissolved in the light focusing plate 40.

As described above, in the present embodiment, the optical detector 16 and the index circuit part 20 are shielding from the influence of the high frequency for preventing the distortion of the index current signals as similarly to the previous embodiment of the present invention, and the circuit arrangement of the index circuit part 20 may be simplified more than the previous embodiment by including the single optical detector 16, thereby much reducing the manufacturing cost of the cathode ray tube.

As described hereinabove, the optical detector and the index circuit part may be protected from the influence of various high frequency noises including the deflection signals by including a high frequency shut-off part, thereby preventing the distortion of the index signals and the degradation of the color purity due to the distortion of the index signals.

What is claimed is:

1. A beam index type cathode ray tube comprising:

a panel;

a phosphor screen formed on an inner surface of the panel and having index stripes;

an electron gun emitting electron beams toward the phosphor screen in response to a color switching signal;

a funnel having a light receiving window;

an index light incident part, formed on an outer peripheral surface of the light receiving window of the funnel, receiving an index light signal emitted from one of the index stripes via the light receiving window;

an optical cable connected to the index light signal incident part, transmitting the index light signal;

an optical detector converting the index light signal provided from the optical cable to an index current signal; and an index circuit part synchronizing the index current signal with the color switching signal and transmitting the color switching signal to the electron gun.

2. The beam index type cathode ray tube of claim 1, further comprising:

a high frequency shut-off part shutting off the optical detector and the index circuit part to block influence of high frequency noises.

3. The beam index type cathode ray tube of claim 1, wherein the index light incident part comprises:

a covering element connected at a side thereof to the optical cable; and a high reflection film formed on an inner wall of the covering element.

4. The beam index type cathode ray tube of claim 3, wherein the high reflection film is reflection-processed with aluminium or magnesium oxide on a mirror surface.

5. The beam index type cathode ray tube of claim 1, wherein the index light incident part comprises a high reflection film which surrounds an end of the optical cable.

6. The beam index type cathode ray tube of claim 5, wherein the high reflection film is reflection-processed with aluminium or magnesium oxide on a mirror surface.

7. The beam index type cathode ray tube of claim 3, wherein the index light incident part further comprises a light focusing plate which is positioned in the covering element.

8. The beam index type cathode ray tube of claim 7, wherein the light focusing plate is formed by an injection molding with poly methyl metacrylate mixed with a fluorescent dye.

9. The beam index type cathode ray tube of claim 1, further comprising:
   a second light receiving window;
   further comprising a second index light incident part, formed at an outer peripheral surface of the second light receiving window of the funnel, receiving a second one of the index light signals emitted from a second one of the index stripes via the second light receiving window;
   a second optical cable connected to the second light incident part, transmitting the second index light signal; and
   a second optical detector converting the second index light signal provided from the second optical cable to a second index current signal;
   wherein the index circuit part combines the index current signal and the second index current signal and synchronizes the combined index current signal with the color switching signal.

10. The beam index type cathode ray tube of claim 1, wherein the optical detector comprises photo multiplier tubes having a high sensitivity with relation to light pulses of an ultraviolet ray range.

11. The beam index type cathode ray tube of claim 1, wherein the optical detector comprises photo diodes having a high sensitivity with relation to light pulses of an ultraviolet ray range.

12. The beam index type cathode ray tube of claim 1, further comprising:
   a prism interposed between the optical cable and the optical detector and formed with surfaces facing each other and respectively attached to the optical cable and the optical detector; and
   a shut-off element, formed with a high reflection film on an inner wall thereof, shutting off the prism.

13. The beam index type cathode ray tube of claim 1, further comprising:
   a second light receiving window;
   a second index light incident part, formed on an outer peripheral surface of the second light receiving window of the funnel, receiving a second one of the index light signals emitted from a second one of the index stripes via the second light receiving window; and
   a second optical cable connected to the second light incident part, transmitting the second index light signal;
   wherein the optical detector is a single one connected to the optical cable and the second optical cable, and converts the index light signal and the second index light signal to the index current signal.

14. The beam index type cathode ray tube of claim 13, further comprising:
   third and fourth light receiving windows;
   third and fourth index light incident parts, respectively formed on outer peripheral surfaces of the third and fourth light receiving windows of the funnel, receiving third and fourth ones of the index light signals emitted from third and fourth ones of the index stripes via the third and fourth light receiving windows, respectively; and
   third and fourth optical cables respectively connected to the third and fourth light incident parts, respectively transmitting the second index light signal;
   wherein the optical detector is connected to the optical cable and the second through fourth optical cables, and converts the index light signal and the second through fourth index light signals to the index current signal.

15. The beam index type cathode ray tube of claim 1, further comprising:
   a prism interposed between the optical cable and the optical detector;
   a shielding element, formed with a high reflection film on a inner wall thereof, shutting off the prism;
   a second light receiving window;
   a second index light incident part, formed on an outer peripheral surface of the second light receiving window of the funnel, receiving a second one of the index light signals emitted from a second one of the index stripes via the second light receiving window; and
   a second optical cable connected to the second light incident part, transmitting the second index light signal;
   wherein the optical detector is a single one connected to the optical cable and the second optical cable via the prism, and converts the index light signal and the second index light signal to the index current signal.

16. The beam index type cathode ray tube of claim 15, further comprising:
   third and fourth light receiving windows;
   third and fourth index light incident parts, respectively formed on outer peripheral surfaces of the third and fourth light receiving windows of the funnel, receiving third and fourth ones of the index light signals emitted from third and fourth ones of the index stripes via the third and fourth light receiving windows, respectively; and
   third and fourth optical cables respectively connected to the third and fourth light incident parts, respectively transmitting the second index light signal;
   wherein the optical detector is connected to the optical cable and the second through fourth optical cables via the prism, and converts the index light signal and the second through fourth index light signals to the index current signal.

17. The beam index type cathode ray tube of claim 2, wherein the high frequency shut-off part comprises:
   a receiving part mounted with the optical detector and the index circuit part therein; and
   a high frequency shut-off film formed on an outer wall of the receiving part.

18. The beam index type cathode ray tube of claim 15, wherein the high frequency shut-off film is formed of a thin stainless steel plate.

19. The beam index type cathode ray tube of claim 17, wherein the receiving part is formed of plastic material.

20. The beam index type cathode ray tube of claim 1, wherein the optical cable comprises a plurality of bundles of optical cables.

21. The beam index type cathode ray tube of claim 15, wherein the prism has two surfaces connecting the surfaces which face each other and which are not parallel to each other, wherein ends of the optical cables respectively connect to the two surfaces.

22. The beam index type cathode ray tube of claim 7, wherein the light focusing plate has a high index of refraction and a low permeability.

23. A beam index type cathode ray tube comprising:

a panel;

a phosphor screen formed on an inner surface of the panel and having index stripes;

an electron beam gun emitting electron beams toward the phosphor screen;

a pair of optical receptors receiving index light signals emitted from one of the index stripes in response to the electron beams; and one optical detector converting the index light signal provided from the pair of optical receptors to an index current signal.

24. The beam index type cathode ray tube of claim 23, further comprising a high frequency shielding part blocking high frequency signals, and comprising the one optical detector.

25. The beam index type cathode ray tube of claim 23, further comprising an index circuit part synchronizing the index current signal with a color switching signal, and transmitting the color switching signal to the electron gun to control the electron beams.

26. The beam index type cathode ray tube of claim 24, further comprising a high frequency shielding part blocking high frequency signals, and comprising the one optical detector and the index circuit part.

27. The beam index type cathode ray tube of claim 23, further comprising:

a funnel having a pair of light receiving windows formed therein;

wherein each of the pair of optical receptors comprises an index light incident part receiving the index light signal emitted from the corresponding one index stripe via the corresponding light receiving window, and an optical cable connected to the index light signal incident part at one end and to the one optical detector at the other end.

28. The beam index type cathode ray tube of claim 26, further comprising:

a prism interposed between a pair of optical cables and the optical detector, and formed with opposite surfaces respectively attached to the pair of optical cables and a surface between the opposite surface attached to the optical detector.

29. The beam index type cathode ray tube of claim 27, wherein the opposite surfaces are not parallel to each other.

30. The beam index type cathode ray tube of claim 27, further comprising a high frequency shielding part blocking high frequency signals, and comprising the prism.

31. The beam index type cathode ray tube of claim 30, wherein the high frequency shielding part further comprises a shielding element having a high reflection film formed on an inner wall thereof, at least partially surrounding the prism.

32. The beam index type cathode ray tube of claim 23, further comprising:

a second pair of optical receptors receiving index light signals emitted from one of the index stripes in response to the electron beams;

wherein the one optical detector converts the index light signals provided from the pair and the second pair of optical receptors to the index current signal.

* * * * *